United States Patent [19]

Sealfon

[11] 4,124,146
[45] Nov. 7, 1978

[54] FLUID METERING DEVICE

[76] Inventor: Andrew I. Sealfon, 305 W. 13th St., New York, N.Y. 10014

[21] Appl. No.: 653,504

[22] Filed: Jan. 29, 1976

[51] Int. Cl.² .............................................. B67D 5/30
[52] U.S. Cl. .................................................... 222/70
[58] Field of Search .................. 222/70, 457, 504, 75, 222/76, 36

[56] References Cited

U.S. PATENT DOCUMENTS

| | | | |
|---|---|---|---|
| 3,257,034 | 6/1966 | Dumm | 222/36 |
| 3,476,291 | 11/1969 | Glaser | 222/76 |
| 3,559,644 | 2/1971 | Stoft et al. | 222/76 X |
| 3,887,110 | 6/1975 | Porter | 222/76 X |
| 3,930,598 | 1/1976 | Slagle | 222/145 X |

*Primary Examiner*—Robert B. Reeves
*Assistant Examiner*—John P. Shannon
*Attorney, Agent, or Firm*—Bauer & Amer

[57] ABSTRACT

An alcoholic beverage, or other fluid, dispenser which uses to advantage the electrical pulsing of an electric pump which, for each pulse, dispenses a discrete fluid volume, to thereby provide as a selected volume of dispensed fluid the sum of said discrete volumes. Among other advantages, variation in the volume of the dispensed fluid is readily achieved by simply correspondingly varying the number of pulses permitted to be transmitted to the pump.

2 Claims, 5 Drawing Figures

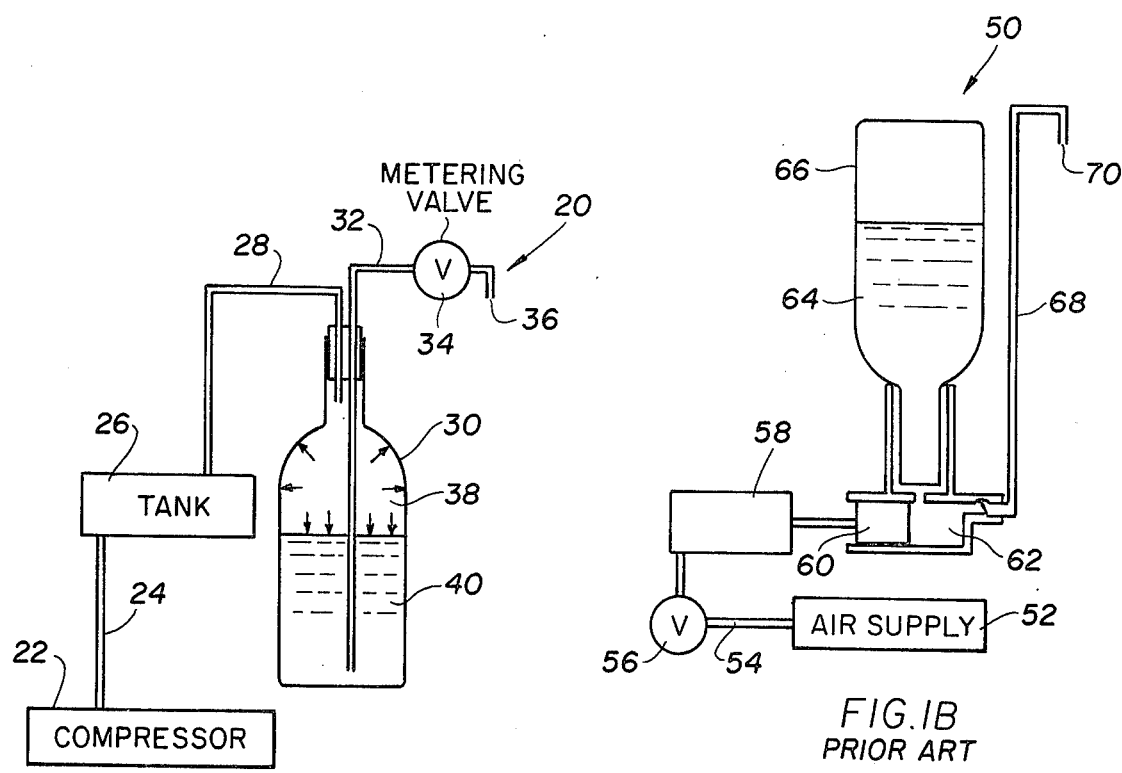
FIG.1A PRIOR ART
FIG.1B PRIOR ART
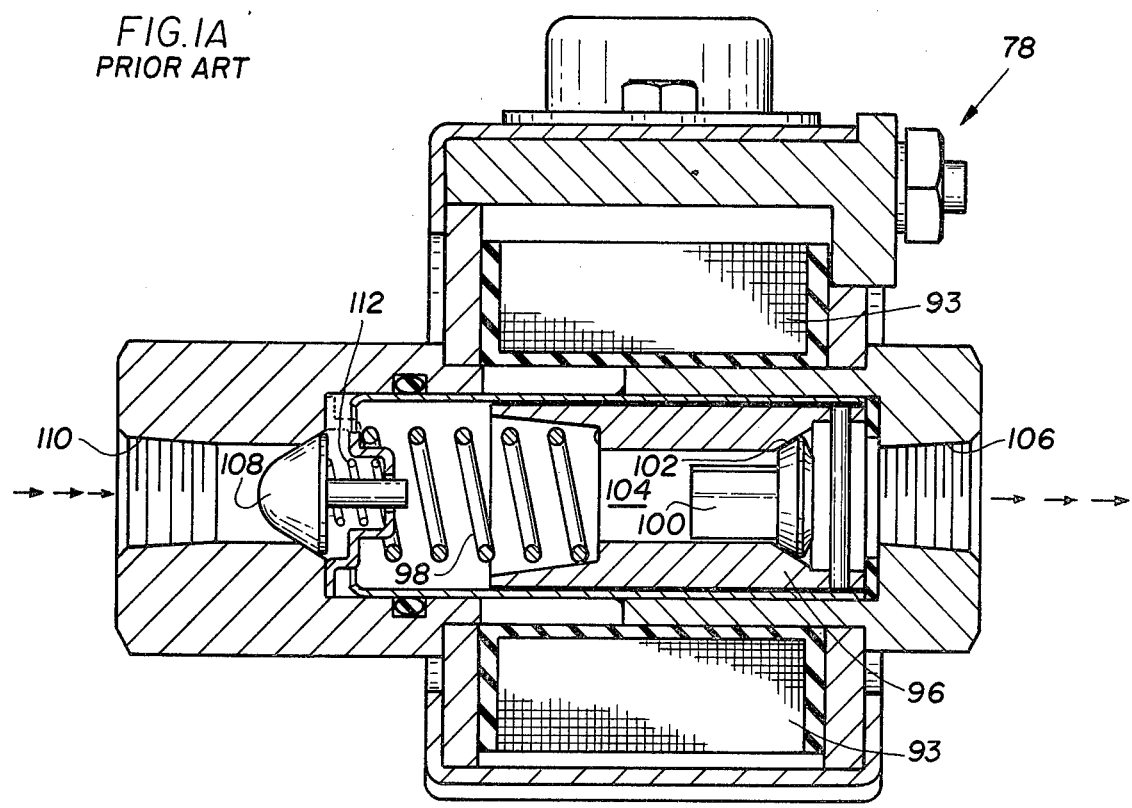
FIG.4

FLUID METERING DEVICE

The present invention relates generally to a fluid metering device, and more particularly to improvements for such a device which obviate any need for pressure air or other pressure medium to cause exiting flow of the dispensed fluid, results in said device being significantly more accurate than known devices, as well as being more readily adjustable as to the volume of dispensed fluid, and which provides other noteworthy operating advantages.

The commercial need for devices for metering or dispensing select volumes of alcoholic beverages, or other fluids, is generally recognized. One reason is that restaurant and other similar establishments are not always attended by the proprietors, and therefore an automated control over the amount of alcoholic beverage dispensed is in obvious accord with good accounting principles and business methods. Also, the quality of the cocktail and other mixed drinks utilizing the dispensed alcoholic beverage is often related to maintaining constancy in the volume of the dispensed alcoholic beverage, and this also is more readily achieved with an automated device, rather than manually.

There are two kinds of known fluid metering devices. In one, pressure air is admitted into the bottle containing the alcoholic beverage and is relied upon to push a selected amount or volume of the alcohol beverage through a metering valve to a point of use.

Among some of the shortcomings of the foregoing is the difficulty in obtaining constancy in the volume dispensed using only a metering valve. A more significant shortcoming is the potential danger that resides in pressurizing the bottle in order to cause flow of the fluid body therefrom. It should be readily recognized that if the pressure air is excessive, or if the storage bottle has a manufacturing defect, that either would result in an explosion, and thus subject those in the vicinity to possible bodily harm.

The other kind of fluid metering device presently in use relies on piston displacement during a single power stroke to provide the required volume of dispensed fluid. Typically, 1½ ounces of dispensed alcoholic beverage is required for cocktails and mixed drinks and this, correspondingly, requires movement of the piston from its ready position through its power stroke for a distance that will provide this volume of dispensed fluid. This power stroke movement in the piston in turn unavoidably requires a pressure air supply tank. More important, the only way that adjustments can be made in the amount or volume of the dispensed fluid is by varying the length of the power stroke of the piston. Providing this degree of adjustment in this prior art device is somewhat difficult and complicates its construction and mode of operation.

Broadly, it is an object of the present invention to provide an improved fluid metering device overcoming the foregoing and other shortcomings of the prior art. Specifically, it is an object to provide a fluid metering device constructed to, and operating, without using any pressure air or similar medium, either in the specific form of a compressor or a pressure air tank, and thus obviating any potential hazard of explosion.

A fluid metering device for dispensing a selected fluid volume demonstrating objects and advantages of the present invention is comprised of a combination (a) of an electrically operated pump of the type adapted to pump a discrete volume of said fluid in response to each electrical pulsing thereof, said pump having an inlet and an outlet, and (b) (i) a source of said dispensed fluid having a first conduit connected to supply said fluid to said pump inlet, (ii) a second conduit connected from said pump outlet to deliver said dispensed fluid to a prescribed point of use, (iii) an electrical circuit operatively connected to operate said pump incuding pulsing means for successively transmitting electrical pulses to said pump at a selected constant frequency, and a timer operatively connected to determine the duration of operation of said pulsing means. Thus, during operation, the fluid volume dispensed at said point of use by said fluid metering device is the sum of said discrete volumes dispensed by said pump for the number of electrical pulses transmitted to said pump during the operating interval thereof as determined by said timer.

Not only is the within fluid metering device significantly commercially useful in the dispensing of selected volumes of alcoholic beverages, but the principles involved in its mode of operation, as well as its structural features, all as will be described subsequently in greater detail, also enables its use in a noteworthy manner for more technical end uses and applications. For example, the within device, because it is capable of dispensing in a repetitive manner precise selected volumes of fluid, can be used to supply chlorine to swimming pools, to supply chemicals in liquid form to mixing tanks during industrial processes, to supply printing ink to printing presses, to supply fluids to the operating mechanisms which contribute to successful xerography in office copying machines, and for other such industrial applications.

The above brief description, a well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIGS. 1A and 1B are prior art illustrations of fluid metering devices, the former utilizing pressure air to cause dispensing of the fluid, and the latter utilizing a displacement of a piston;

FIG. 4 is a side elevational view, on an enlarged scale, of the preferred electrically operated pump for the within fluid metering device.

Figure 2:
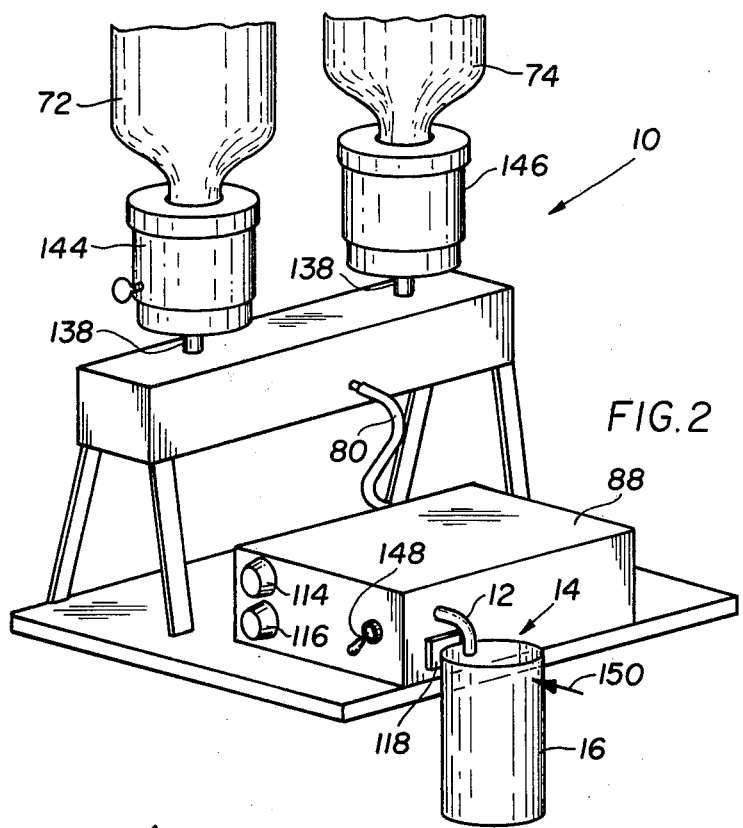
FIG. 2 is a perspective view of the improved fluid metering device according to the present invention.
Figure 3:
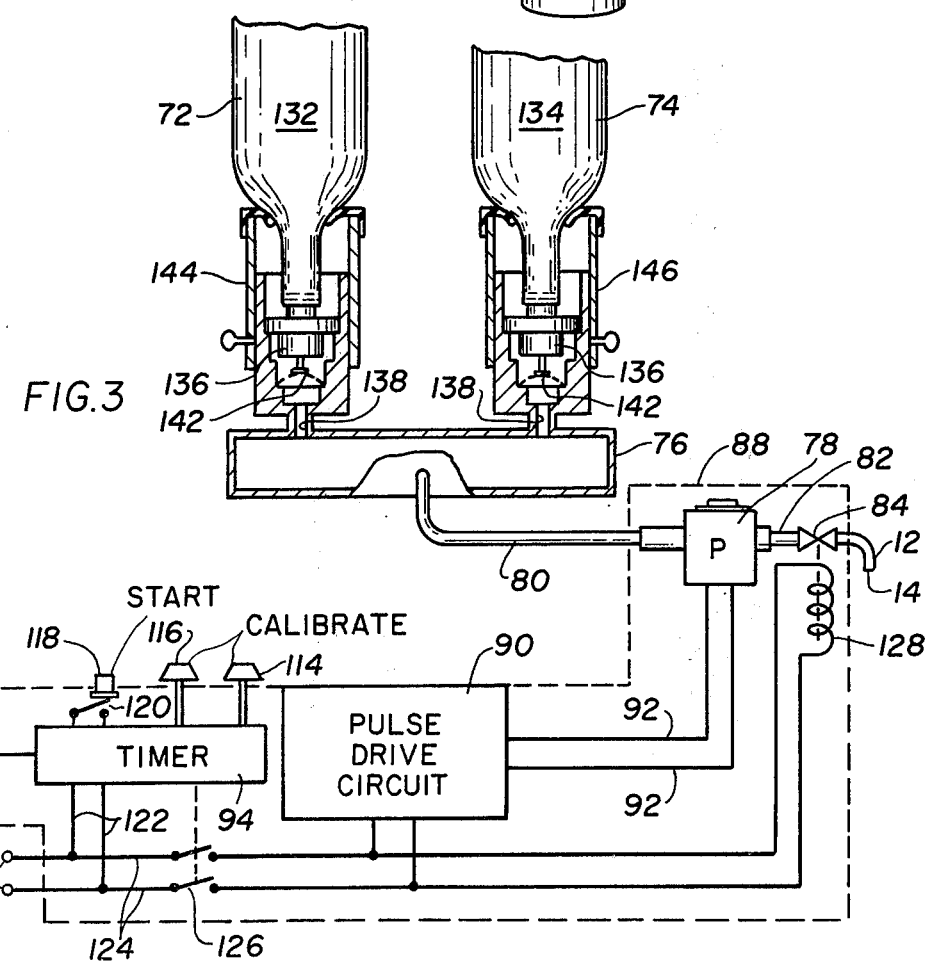
FIG. 3 is a combined side elevational view and circuit diagram of the electrical components comprising the improved fluid metering device hereof.

Reference is now made to the drawings, and in particular to FIGS. 2, 3, wherein there is shown a fluid metering device, generally designated 10, demonstrating objects and advantages of the present invention. Generally, device 10 includes a fixture 12 serving as an outlet for delivering a selected volume of fluid to a prescribed point of use, designated 14 in FIG. 2. More particularly, positioned at the point of use 14 may be a glass 16 to receive the dispensed fluid which typically may be an alcohlic beverage or the like. In this regard, device 10 may be used in restaurants, country clubs, and even on board airplanes or other means of transportation, for the purpose of dispensing selected volumes of alcoholic beverages to be used in the making of cocktails and other liquid refreshments. As generally understood, there is a significant commercial need for liquid or fluid metering devices, as exemplified by device 10, for a variety of reasons. One reason is that restaurants and the other mentioned establishments are not always attended by the proprietors, and therefore an automated control over the amount of alcoholic beverage dispensed is in obvious accord with good accounting principles and business methods. Also, the quality of the cocktail and other mixed drinks utilizing the dispensed alcoholic beverage is often a function of maintaining constancy in the volume of the dispensed alcoholic beverage, and this also is more readily achieved with an automated device, as exemplified by the device 10, rather than manually.

Not only is device 10 significantly commercially useful in the dispensing of selected volumes of alcoholic beverages, but the principles involved in its mode of operation, as well as its structural features, all as will be described subsequently in greater detail, also enables its use in a noteworthy manner for more technical end uses and applications. For example, device 10, because it is capable of dispensing in a repetitive manner precise selected volume of fluid can be used to supply chlorine to swimming pools, to supply chemicals in liquid form to mixing tanks during industrial processes, to supply printing ink to printing presses, to supply fluids to the operating mechanisms which contribute to successful xerography in office copying machines, and for other such industrial applications.

A better understanding of the mode of operation and of noteworthy structural features of the improved fluid metering device 10 according to the present invention, as illustrated in FIGS. 2, 3, is perhaps enhanced by a prior discussion of prior art devices with which it contrasts significantly. To this end, attention is directed first to FIGS. 1A and 1B which respectively illustrate fluid metering devices 20 and 50. More particularly, device 20 is of the type which utilizes a pressure air compressor 22 connected via conduit 24 to a storage tank 26. Tank 26 is in turn connected via conduit 28 to the source of the alcoholic beverage which typically is a bottle 30. Outlet 32 containing a metering valve 34 channels the dispensed fluid to the point of use 36. As just generally described, and as generally understood, the pressure air, more particularly designated 38 in FIG. 1A, is relied upon to push the selected amount or volume of the alcoholic beverage 40 through the metering valve 34 to the point of use 36.

Among some of the shortcomings of the prior art device 20 of FIG. 1A is the difficulty in obtaining constancy in the volume dispensed using only a metering valve. A more significant shortcoming is the potential danger that resides in pressurizing the bottle 30 in order to cause flow of the fluid body 40 therefrom. It should be readily recognized that if the pressure air 38 is excessive, or if the storage bottle 30 has a manufacturing defect, that either would result in an explosion, and thus subject those in the vicinity to possible bodily harm. The situation is particularly aggravated if the fluid metering device 20 is utilized on board an aircraft. Another shortcoming of the system is the requirement that use be made of a compressor 22, which typically is heavy and noisy.

The prior art device 50 of FIG. 1B obviates many of the shortcomings of device 20, but is not a totally satisfactory solution. Device 50 also may require a compressor, although it more readily can also utilize a source of pressure air, which may be derived from a storage tank 52. The pressure air exits via the conduit 54 in an amount controlled by valve 56 into a pumping mechanism 58 containing a piston (not shown). Operatively connected to the piston within the pump 58 is an operating piston 60 which reciprocates in a cylindrical chamber 62. Feeding by gravity or otherwise into chamber 62 is the alcoholic beverage 64 stored in an upside-down bottle container 66. It should be readily appreciated that reciprocating movement of the piston 60 is effective in pushing measured quantities of the fluid 64 through the outlet conduit 68 to the point of use 70.

Although device 50 does not present the potential danger of explosion as does device 20, it has significant shortcomings. One shortcoming is that it does require the pressure air supply 52 in order to operate the piston pump 58. More important, it will be noted that the volume of fluid delivered at the point of use 70 is directly related to the single power stroke of the piston 60. Typically, 1½ ounces of dispensed alcoholic beverage is required for cocktails and mixed drinks and this, correspondingly, requires movement of the piston 60 from its ready position through its power stroke for a distance that will provide this volume of dispensed fluid. This power stroke movement in the piston 60 in turn unavoidably requires the pressure air supply tank 52. More important, the only way that adjustments can be made in the amount or volume of the dispensed fluid is by varying the length of the power stroke of the piston 60. Providing this degree of adjustment in the device 50 is somewhat difficult and complicates its construction and mode of operation.

In accordance with the present invention, it is proposed using the device 10, as illustrated in FIGS. 2, 3, in which the pressure air source, either in the specific form of a compressor 22 or a pressure air tank 52, is totally avoided, and in which other noteworthy advantages accrue. For example, since a source of pressure air is obviated, there is correspondingly obviated the potential hazard of explosion which is inherent in the prior art device 20, as previously discussed. Also, as will be described in greater detail subsequently, device 10 includes a simplified and noteworthy means for adjusting the amount or volume of the fluid dispensed therefrom, and thus represents a significant advance in the respect just mentioned over the prior art device 50.

Referring to FIGS. 2, 3 and 4, device 10 includes, as one of its major components, at least one, and preferably two, inverted bottles 72 and 74 of an alcoholic beverage, which each empty into a container or reservoir 76. Another major component is an electric pump. The specifically selected electrically operated pump, generally designated 78, is one having a mode of operation and construction which is readily commercially available and which will be discussed in greater detail subsequently. At this point it suffices to note that pump 78 has a conduit 80 connection to the reservoir 76 so as to draw fluid therefrom. At its opposite end, pump 78 has an outlet conduit 82, including a solenoid or other electrically operated valve 84, through which the selected volume (e.g. 1½ ounces of alcoholic beverage) is delivered to the previously noted outlet fixture 12, and thus to the point of use 14.

The heart and crux of the inventive contribution of the device 10 resides in the components and electric circuit for operating the pump 78. These components and circuitry are conveniently located in a housing 88 and include any one of several readily commercially available models of electrical means designated "pulse drive circuit" in FIG. 3, and designated 90 therein, for transmitting electrical pulses via conductors 92 to pump 78 at a constant frequency. That is, pulser 90 transmits an electrical pulse at any selected frequency, as for example 28 pulses per second, via the conductors 92 to the electrically operated pump 78 and, it will be understood, that upon each reception of an electrical pulse by the pump 78 it is activated into pumping operation. The significance of this will become obvious as the description proceeds.

Cooperating with the pulser 90, and representing another major component of the device 10, is a timer 94 which is electrically connected to close the energizing circuit for the pulser 90 for any prescribed duration of time, at the end of which timer 94 is effective in opening the energizing circuit and thus terminating the operation of the pulser 90. The termination of the operation of the pulser 90 will of course be recognized as resulting in this component ceasing to transmit operating pulses to the pump 78, and thereby correspondingly terminating the operation of the pump 78.

At this point in the description reference should be made to the detailed illustration provided in FIG. 4 of the pump 78. It will be understood that pump 78 is of a type which is readily commercially available, one such commercial source being the Motor Components Division of Facet Enterprises Inc., of Elmira, N.Y. Pump 78, as supplied by the commercial source just mentioned and other commercial sources, is properly characterized as an electrically operated pump in that it includes a solenoid 93 which will be understood to be electrically connected so as to receive the electrical pulses previously noted via the conduit 92. At each electrical pulsing of the solenoid 93, piston 96 is actuated through movement from its position as shown to the left, having these consequences. First, it results in compression of the return spring 98. Second, it releases valve 100 from its seated position against the conical valve seat 102. This results in fluid within the pump chamber 104 flowing to the right past the valve 100 and thus through the pump outlet opening 106 which will be understood to have a fluid connection to the previously noted outlet conduit 92.

When the energizing of the solenoid 93 is completed, and thus when the magnetic field thereof decays, return spring 96 biases piston 96 back into its seated condition as illustrated in FIG. 4. When this occurs, there is a decrease in pressure in the piston chamber 104 which results in the movement of an inlet valve 108 from its position as illustrated in FIG. 4 which closes off the inlet opening 110 of the pump 78. It will be understood that inlet 110 is connected to the inlet conduit 80 so that when the inlet valve 108 moves to the right, as viewed in FIG. 4, aided in part by the urgency of spring 112, pump chamber 104 is again charged with a discrete volume of fluid. In each repetition of the operating cycle, which occurs of course with the pulsing of the solenoid 93, fluid in the chamber 104 is displaced by movement of the piston 96 to the left, resulting in said fluid flowing out of the outlet 106, in the manner already described.

As already noted, the construction and operation of the electrically operated pump 78 is well known, being used as a fuel pump for aircraft and in similar installations. One of the significant contributions of the present invention is the recognition that the operation of pump 78 results in the delivery by it of a discrete volume for each pulsing of the solenoid 93. Thus, in accordance with the present invention, it is contemplated to operate pump 78 by a selected number of pulses, each pulse of which contributes a discrete volume, and in this way obtaining as the sum of the discrete volumes a total volume which it is desired to be dispensed from the device 10.

Stated another way, by selecting an appropriate number of pulses to be transmitted by the pulser 90 to the pump 78, it has been possible to achieve a sum of discrete volumes delivered by the pump 78 which provides the volume of dispensed fluid, such as 1½ ounces, which meets the use requirements of the device 10. More importantly, since the volume of the dispensed fluid at the point of use 14 is a function of the amount of pulses delivered by the pulser 90 to the pump 78, it is of course readily possible to vary the amount of the dispensed fluid by merely varying the number of pulses which it is permitted the pulser 90 to deliver or transmit to the pump 78.

The preferred manner in which control is exercised over the amount of pulses transmitted by the pulser 90 to the pump 78 is achieved using the timer 94. More particularly, since pulser 90 operates at a constant frequency, by lengthening or shortening the duration of its operation, using timer 94 to achieve this, it is possible to correspondingly vary the number of pulses delivered by the pulser 90 to the pump 78. The time of duration of the timer 94 is achieved by knob controls 114 and 116, the former being effective for fine adjustment in the range of 0 to 9 seconds, and the latter providing adjustments in 10-second units. Thus, to obtain an interval of operation of the timer 94 for "34" seconds, knob 116 is set at "3" and knob 114 at "4". Alternatively, the knob controls 114, 116 can be related to specific time intervals. In the described end use, for example, knob control 114 can be arranged to provide a selected volume associated with a "regular pour", whereas knob control 116 provides the selected volume of a "long pour". In this instance, switch 148 would be utilized to select between the controls 114 and 116.

In operation, start button 118 is depressed, closing switch 120 and thus connecting timer 94 via conductors 122 to the power source 124 which, where portability is required, may consist of portable batteries. Energization of the timer 94 results in closing of the circuit switches 126 which results in energization of the pulser 90 and its operation, already described, which results in the transmission of electrical pulses via the conductors 92 to the pump 78 in accordance with a constant frequency. The closing of switches 126 also results in the energizing of the coil 128 of the previously noted solenoid of the valve 84 which coil, when energized, results in the opening of this normally closed valve. This of course enables fluid delivered through the outlet conduit 82 to be delivered to the outlet 12 and thus to the point of use 14.

At the conclusion of the selected timed duration of operation of the timer 94, the circuit switch 126 is opened and results in de-energization of the pulser 90 and thus a termination of its pulsing operation. By that time, however, pulser 90 has already delivered the requisite number of pulses to the pump 78 to in turn result in the delivery by the pump of a sum of discrete volumes for said number of electrical pulses which provides the 1½ ounces or whatever other quantity of alcoholic beverage is required to be dispensed at the point of use 14. As already noted and as should be readily appreciated from the foregoing description, to vary the volume of the dispensed fluid it is necessary only to vary the duration of operation of the timer 94 which correspondingly varies the number of pulses delivered by the pulser 90 to the pump 78.

Consistent with sound accounting practices and business control techniques, cooperatively connected to the timer 94 is a counter 130 which counts and thus records each dispensing operation of the device 10. Thus, assuming that counter 130 indicates operation of the device 10 "100" times, it can be assumed that the device was utilized in preparing 100 cocktails or other mixed drinks, and that therefore there should be revenue or monetary receipts of a corresponding amount.

In the preferred embodiment of the device 10, the level of the alcoholic beverage obtained from the source or bottles 72, 74 is maintained at a constant elevation within the reservoir 76 so that there is no variation in the head pressure at the pump inlet 80 which could correspondingly affect the constancy of the volume dispensed by device 10 for successive durations of operation of the same time interval. As illustrated, the level control may consist simply of permitting the bodies 132 and 134 of alcoholic beverage to flow by gravity through outlet mechanisms 136 through strainers 142 and through inlet openings 138 into the reservoir 76 until completely filling the same. Gravity flow continues until the level of the bottle outlets 136 are reached, at which stabilization occurs since air cannot enter the bottles 72, 74 above this level. Naturally, as fluid is dispensed from the reservoir 76 and the level drops below the outlet mechanisms 136, the bottles empty to replenish the supply of the reservoir 76. In this manner, the level of the source fluid is maintained substantially at the level of the outlet mechanism 136 and thus there is eliminated any variation in head pressure for all practical purposes.

In order to insure constancy in the selected volume or amount of fluid dispensed by the device 10, it is also advisable, when accuracy demands, to obviate any variation that may result from volume variation in the outlet conduit 82. This is readily achieved by including in outlet 82 the previously noted normally closed valve 84. Operating the same way that closing one end of a straw prevents movement of fluid through the opposite end of the straw, when valve 84 assumes its normally closed position this prevents any movement of fluid, by dripping or otherwise, from exiting from the outlet fixture 12. Thus, fixture 12 is always fully charged with fluid from valve 84 to the point of use 14. Outlet 82 is, of course, also fully charged with fluid since there is a favorable pressure gradient providing this result because of the strategic location of the pump 78 at one end of the conduit 82 and the normally closed valve 84 at its other end.

For completeness sake, the structural features noted in conjunction with FIG. 3, as well as other features not heretofore noted, will now be pointed out in FIG. 2. Specifically, the bottles 72 and 74 are shown mounted in their inverted condition on support mountings 144 and 146. From the housings 144 and 146, there is gravity flow of the dispensed fluid through the passages 138 into the reservoir 76 and from thence through the conduit 80, which may be a flexible hose or the like, to pump 78 within housing 88. Extended from one side of housing 88 is an on-off switch 148 and the control knobs 114, 116. The previously noted start button 118 may advantageously be provided immediately below the outlet fixture 12 where it can be depressed by movement 150 of the glass 16 which receives the dispensed fluid.

From the foregoing description it should be readily appreciated that the device 10 represents a significant advance over the prior art fluid dispensing devices, as exemplified by devices 20 and 50, in that it does not require any source of pressure air, has much greater accuracy and constancy in the selected volume of fluid being dispensed, and is much more readily and easily adjustable in the amount or volume of fluid being dispensed, as well as possessing other attributes and advantages.

A latitude of modification, change and substitution is intended in the foregoing disclosure and in some instances some features of the invention will be employed without a corresponding use of other features. As an example, from the foregoing disclosure it should be apparent that in lieu of a "timer" as the circuit component 94 that the same function is readily performed by a pulse counter. Accordingly, it is appropriate that the appended claims be construed broadly and in a manner consistent with the spirit and scope of the invention herein.

What is claimed is:

1. A fluid metering device for dispensing a selected fluid volume comprising a combination of an electrically operated pump of the type adapted to pump a discrete volume of said fluid in response to each electrical pulsing thereof, said pump having an inlet and an outlet and a solenoid which is adapted to cause pumping operation thereof when electrically pulsed, said pumping operation consisting of the dispensing of a discrete fluid volume for each electrical pulse, and a source of said dispensed fluid having a first conduit connected to supply said fluid to said pump inlet, a second conduit connected from said pump outlet to deliver said dispensed fluid to a prescribed point of use, an electrically operated solenoid valve strategically located in said conduit adjacent said point of use effective to maintain said second conduit fully charged with fluid between said pump outlet and said point of use, an electrical circuit operatively connected to operate said pump including pulsing means for successively transmitting electrical pulses to said pump at a selected constant frequency and simultaneously therewith to pulse said solenoid valve into an open condition to allow the exiting flow therethrough of fluid, and means including a timer operatively connected to initiate the commencement of the operation of said pulsing means and the subsequent termination thereof after a selected duration of time such that said pulsing means transmits said pump-operating electrical pulses to said pump solenoid during said duration of time at said selected constant frequency, whereby the fluid volume dispensed at said point of use by said fluid metering device is the sum of said discrete volumes dispensed by said pump for the number of electrical pulses transmitted to said pump during the operating interval thereof as determined by said timer.

2. A fluid metering device as claimed in claim 1 including a counter operatively connected in controlling relation to said timer so as to record each fluid dispensing operation of said fluid metering device.

* * * * *